3,660,492
SYNTHESIS OF DIISOPROPYL KETONE

Harold W. Tompkins, Bartlesville, Okla., assignor to Phillips Petroleum Company
No Drawing. Filed July 22, 1969, Ser. No. 843,784
Int. Cl. C07c 49/06, 47/04
U.S. Cl. 260—593        5 Claims

ABSTRACT OF THE DISCLOSURE

Diisopropyl ketone is produced by passing 2,2,4-trimethyl-1,3-pentanediol over activated alumina catalyst at a temperature in the approximate range 650–975° F. and at approximately 1–6 volumes of feed to volume of catalyst per hour. A product purity of 98 weight percent or better is obtained.

---

In one of its aspects, this invention relates to the production of diisopropyl ketone. In another of its aspects, the invention relates to the provision of a catalyst suited to the preparation of diisopropyl ketone. In a further aspect of the invention, it relates to the production of diisopropyl ketone by conversion of 2,2,4-trimethyl-1,3-pentanediol.

In one of its concepts, the invention provides a method for the conversion of 2,2,4-trimethyl-1,3-pentanediol by contacting the same with an activated alumina catalyst such as Alcoa F–1 Alumina. In another of its concepts, the invention provides for the conversion of 2,2,4-trimethyl-1,3-pentanediol to diisopropyl ketone at an elevated temperature in the approximate range 650–975° F. to obtain yields as high as 36 volume percent or higher and product purities of 98 weight percent or better.

The reaction involved is illustrated by the following equation

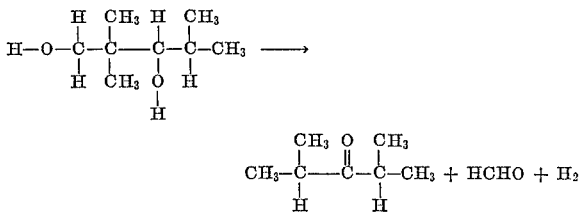

I have now found that I can very effectively dehydrate 2,2,4-trimethyl-1,3-pentanediol by passing the same into contact, under suitable conditions, with Alcoa F–1 Alumina.

Alcoa F–1 Alumina catalyst is essentially an activated alumina—a product of Aluminum Company of America, Pittsburgh, Pa. Other commercial activated alumina that can be used as catalyst for this reaction are: KA 101 and KA 201 Alumina products of Kaiser Chemical Company, Extrudate–100 sold by American Cyanamid and Filtrol Grade 86 sold by the Filtrol Corporation.

Thus, it will be seen that the activated alumina catalyst appears to possess characteristics which are suited to the conversion of the 2,2,4-trimethyl-1,3-pentanediol.

An object of this invention is to provide a process for the production of diisopropyl ketone. Another object of the invention is to provide a catalyst for the conversion of 2,2,4-trimethyl-1,3-pentanediol to diisopropyl ketone. A further object of the invention is to convert 2,2,4-trimethyl-1,3-pentanediol in the presence of activated alumina.

According to the present invention 2,2,4-trimethyl-1,3-pentanediol is passed into contact with an activated alumina catalyst as herein described at an elevated temperature, for example, 650–975° F., and at about 1–6 volumes of feed per volume of catalyst per hour.

Pure alumina that is activated is the preferred catalyst. However, impure alumina, such as bauxite, that is activated can also be used as a catalyst for the conversion of 2,2,4-trimethyl-1,3-pentanediol to diisopropyl ketone.

As a feature of the invention certain recoverable by-products are also obtained, namely, isobutyraldehyde in particular. This by-product is valuable and is helpful in the economics of the process.

The following is a specific example of the invention.

EXAMPLE 2,2,4-trimethyl-1,3-pentanediol was passed over 300 ml. of Alcoa F–1 alumina catalyst having an 8–14 mesh size contained in a ¾ inch I.D. by 3 foot long catalyst case mounted in an electrically heated furnace at rates of 1 to about 6 liquid volumes per volume of catalyst per hour.

Alcoa F–1 alumina is an activated alumina with the following analysis:

|   | Weight percent |
|---|---|
| $Al_2O_3$ | 92.0 |
| $Na_2O$ | 0.2 |
| $Fe_2O_3$ | 0.12 |
| $SiO_2$ | 0.09 |
| $TiO_2$ | 0.01 | and having a surface area of 210 square meters per gram.

The table below summarizes runs made at various temperatures using Alcoa F–1 alumina catalyst. It will be seen that yields of diisopropyl ketone as high as 38.1 weight percent as shown by chromatographic analysis have been obtained.

Distillation of the heart cut of the reaction product yielded diisopropyl ketone having a purity of 98.6 weight percent as determined by chromatographic analysis.

Valuable by-products included formaldehyde, 2-methyl propanal and 2,4-dimethylpentene-2. It is noteworthy that in some of the runs substantially complete conversion of the trimethyl pentanediol was obtained.

SYNTHESIS OF DIISOPROPYL KETONE

| Catalyst temp., °F. | Volume liquid feed/volume catalyst/hr. | Water vol. percent in crude | Weight percent by chromatograph | | | | | |
|---|---|---|---|---|---|---|---|---|
| | | | Formaldehyde | 2-M[1] propanal | 2,4-DMP-2[2] | DIIPK[3] | TMPD[4] | Heavies |
| 670 | 3.3 | 3.1 | 10.4 | 18.3 | 12.3 | 27.8 | 2.7 | 0.0 |
| 750 | 3.3 | 2.8 | 3.7 | 0.0 | 7.7 | 22.9 | 36.3 | 0.0 |
| 800 | 3.3 | 9.5 | 4.9 | 13.4 | 18.6 | 42.7 | 0.0 | 0.0 |
| 810 | 3.3 | 10.0 | 10.4 | 18.3 | 12.3 | 37.8 | 0.5 | 0.0 |
| 910 | 3.3 | 9.0 | 5.6 | 15.3 | 21.1 | 36.7 | 0.0 | 0.0 |
| 750 | 1.4 | 5.6 | 12.0 | 7.5 | 31.3 | 38.1 | 0.0 | 0.0 |

[1] 2-methyl propanal (isobutyraldehyde).
[2] 2,4-dimethylpentene-2.
[3] Diisopropyl ketone.
[4] 2,2,4-trimethyl-1,3-pentanediol.

Reasonable variation and modification are possible within the scope of the foregoing disclosure and the appended claims to the invention the essence of which is that 2,2,4-trimethyl-1,3-pentanediol has been converted over an activated alumina catalyst such as Alcoa F-1 catalyst at the given operating conditions to obtain, notably, diisopropyl ketone and certain valuable byproducts.

I claim:

1. The conversion of 2,2,4-trimethyl-1,3-pentanediol to diisopropyl ketone which comprises subjecting the same to conversion in the presence of an activated alumina catalyst at a temperature in the range of 650–975° F.

2. A process according to claim 1 wherein the 2,2,4-trimethyl-1,3-pentanediol is passed at an approximate rate of 1–6 volumes per volume of catalyst per hour to the catalyst, based on the liquid 2,2,4-trimethyl-1,3-pentanediol.

3. A process according to claim 1 wherein the catalyst is Alcoa F-1 Alumina catalyst which contains approximately the following on a weight percent basis:

| | Weight percent |
|---|---|
| $Al_2O_3$ | 92.0 |
| $Na_2O$ | 0.8 |
| $Fe_2O_3$ | 0.12 |
| $SiO_2$ | 0.09 |
| $TiO_2$ | 0.01 | and which has a surface area of approximately 210 square meters per gram.

4. A process according to claim 1 wherein the catalyst consists essentially of and has a surface area of 210 square meters per gram.

5. The substantially complete conversion according to claim 1 of 2,2,4-trimethyl-1,3-pentanediol to useful products including a substantial proportion of diisopropyl ketone, 2,4-dimethylpentene-2 and 2-methyl propanal which comprises contacting 2,2,4-trimethyl-1,3-pentanediol with a catalyst consisting of an activated alumina having the following approximate analysis:

| | Weight percent |
|---|---|
| $Al_2O_3$ | 92.0 |
| $Na_2O$ | 0.8 |
| $Fe_2O_3$ | 0.12 |
| $SiO_2$ | 0.09 |
| $TiO_2$ | 0.01 | and has a surface area of 210 square meters per gram; at a temperature in the approximate range of 670–910° F. at a rate of from about one to about six liquid volumes per volume of catalyst per hour.

References Cited

UNITED STATES PATENTS 3,098,100  7/1963  Frevre _____ 260—593 R
3,235,602  2/1966  Russell _____ 260—593 R DANIEL D. HORWITZ, Primary Examiner U.S. Cl. X.R.
260—606; 252—463